United States Patent
Sanada et al.

[11] Patent Number: 5,865,500
[45] Date of Patent: Feb. 2, 1999

[54] FRONT GRILLE MOUNTING CONSTRUCTION

[75] Inventors: Michitaka Sanada; Takashi Kaneko, both of Hamamatsu, Japan

[73] Assignee: Suzuki Motor Corporation, Hamamatsu, Japan

[21] Appl. No.: 687,141

[22] Filed: Jul. 24, 1996

[30] Foreign Application Priority Data

Aug. 16, 1995 [JP] Japan .................................... 7-208677
Aug. 16, 1995 [JP] Japan .................................... 7-208678

[51] Int. Cl.$^6$ .................................................. B60R 19/52
[52] U.S. Cl. ........................... 296/194; 293/115; 180/68.6
[58] Field of Search ............................. 296/194; 293/115; 180/68.6

[56] References Cited

U.S. PATENT DOCUMENTS

| | | | |
|---|---|---|---|
| 4,354,566 | 10/1982 | Yuda | 293/115 X |
| 4,597,603 | 7/1986 | Trabert | 296/194 |
| 4,645,250 | 2/1987 | Bauer et al. | 293/115 |

FOREIGN PATENT DOCUMENTS

| | | | |
|---|---|---|---|
| 41275 | 12/1981 | European Pat. Off. | 180/68.6 |
| 332846 | 9/1989 | European Pat. Off. | 180/68.6 |
| 2355972 | 5/1974 | Germany | 180/68.6 |
| 2441659 | 3/1976 | Germany | 180/68.6 |
| 38 08 284 | 3/1992 | Germany . | |
| 31845 | 3/1981 | Japan | 180/68.6 |
| 34541 | 4/1981 | Japan | 293/115 |
| 109758 | 4/1990 | Japan | 293/115 |
| 127146 | 5/1990 | Japan | 293/115 |
| 171359 | 7/1990 | Japan | 293/115 |
| 2-171359 | 7/1990 | Japan . | |
| 3-153437 | 7/1991 | Japan . | |
| 4-90927 | 3/1992 | Japan . | |
| 406219224 | 8/1994 | Japan | 293/115 |

*Primary Examiner*—Dennis H. Pedder
*Attorney, Agent, or Firm*—Bell Seltzer Intellectual Property Law Group of Alston & Bird LLP

[57] ABSTRACT

An object of the present invention is to prevent an engaging member such as a clip from coming out and to enhance the holding force of the engaging member.

In the present invention, there is provided a bracket 4 fixed to a support plate portion 2a on a front fender 2 on the body side and a locking claw 6a formed on a front grille 6 at a position corresponding to the bracket 4. The bracket 4 is provided with a mounting hole 4b engaging with a clip 10 serving as an engaging member and an engaging flange 4a engaging with the locking claw 6a. The clip 10 is inserted in the mounting hole 4b and the locking claw 6a is locked by the engaging flange 4a to mount the front grille 6 to the body without looseness. The bracket 4 is fixed not only to the front fender 2 on the body side but also to a lamp support, which is not shown.

8 Claims, 5 Drawing Sheets

FRONT GRILLE MOUNTING CONSTRUCTION

FIELD OF THE INVENTION AND RELATED ART STATEMENT

The present invention relates to a front grille mounting construction and, more particularly, to a front grille mounting construction which is suitable for not only the mounting of a front grille to a body of an automobile but also the mounting of a front grille to a body of an object other than an automobile.

When a front grille is mounted to a body of an automobile, an mounting construction as shown in FIG. 8 has so far been used. In this mounting construction, mounting holes 2b formed at the front end of a front fender 2 of a body 1 and an mounting hole 5b formed in a center member 5 at the front center are provided, and clips, which are inserted and held in through holes on the back side, not shown, of a front grille 6, are inserted in the mounting holes 2b and 5b corresponding to each clip, by which the front grille 6 is mounted to the body 1.

OBJECT AND SUMMARY OF THE INVENTION

However, the above-described conventional front grille mounting construction has a problem in that the clip is easy to come out from the mounting hole 2b at the front end of the front fender 2, and the clip inserted in the mounting hole 5b in the center member 5 is easy to slip off from the through hole in the front grille 6.

The present invention was made to solve the above problem, and an object thereof is to provide a front grille mounting construction in which the holding force of a clip is enhanced to prevent the clip from coming out.

To achieve the above object, the present invention in accordance with a first preferred embodiment thereof provides a front grille mounting construction for mounting a front grille to a body by using an engaging member inserted and held in a through hole on the front grille side, comprising: a bracket fixed to the body, and an locking claw formed on the front grille at a position corresponding to the bracket, the bracket being provided with a mounting hole engaging with the engaging member and an engaging flange engaging with the locking claw, and the engaging member being fitted to the mounting hole and the locking claw being locked by the engaging flange to mount the front grille to the body.

According to the present invention as embodied in a second preferred embodiment thereof, the bracket is fixed at a plurality of places on the body side.

The present invention in accordance with a third preferred embodiment thereof provides a front grille mounting construction for mounting a front grille to a body by using an engaging member inserted and held in a through hole on the front grille side, comprising: a rib which is provided near the through hole on the front grille side so as to protrude toward the body, a mounting hole at a position corresponding to the through hole on the body side, and a seating face at a position corresponding to the rib, the front grille being mounted to the body with the tip end of the engaging member being pushed into the mounting hole and the rib abutting on the seating face.

According to the present invention as embodied in a fourth preferred embodiment thereof, the rib is provided on both sides of the through hole on the front grille side.

The present invention achieves the following effects.

In accordance with the first preferred embodiment of the invention, the front grille mounting construction comprises a bracket fixed to the body, and an locking claw formed on the front grille at a position corresponding to the bracket. The bracket is provided with a mounting hole engaging with the engaging member and an engaging flange engaging with the locking claw, and the engaging member is fitted to the mounting hole and the locking claw is locked by the engaging flange to mount the front grille to the body. Since not only the engaging member is fitted in the mounting hole but also the locking claw is locked by the engaging flange, the engaging member holding force of the front grille is enhanced, and also the front grille holding force of the bracket is enhanced. Therefore, the engaging member such as a clip can be prevented from coming out without increasing the number of parts.

According to the second preferred embodiment of the invention, the bracket is fixed at a plurality of places on the body side, so that the rigidity of the front parts such as a fender and a grille can be increased.

In accordance with the third preferred embodiment of the invention, the front grille mounting construction comprises a rib which is provided near the through hole on the front grille side so as to protrude toward the body, a mounting hole at a position corresponding to the through hole on the body side, and a seating face at a position corresponding to the rib. The front grille is mounted to the body with the tip end of the engaging member being pushed into the mounting hole and the rib abutting on the seating face. Since the rib on the front grille side abuts on the seating face on the body side, the engaging member holding force of the front grille is enhanced, looseness of installation between the front grille and the engaging member is eliminated, and the engaging member such as a clip can be prevented from coming out without increasing the number of parts.

DETAILED DESCRIPTION OF PREFERRED EMBODIMENTS

Figure 1:
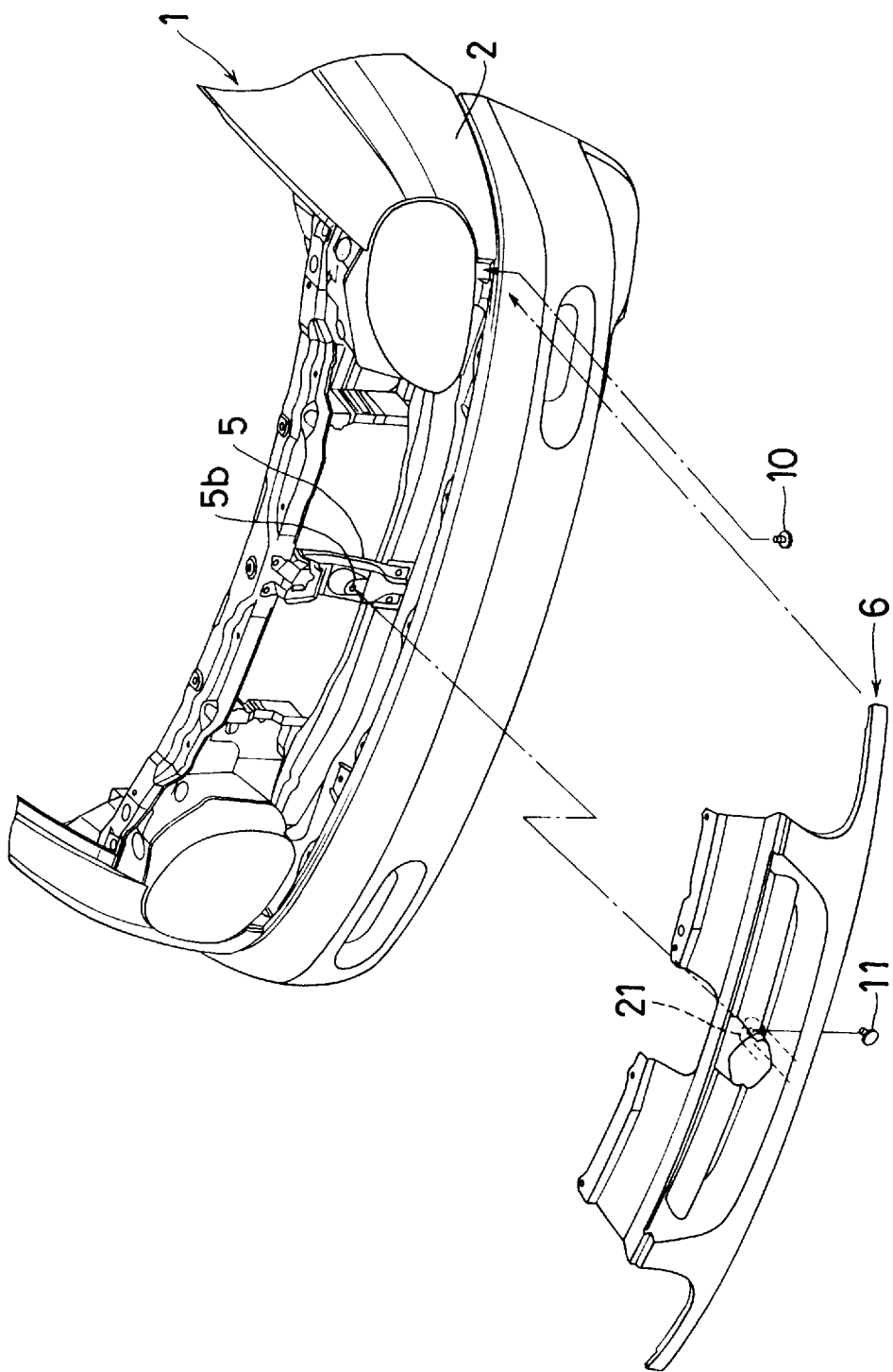
FIG. 1 is a perspective view showing a principal part of automobile to which a front grille mounting construction according to an embodiment of the present invention is applied and a front grille.

A front grille mounting construction according to an embodiment of the present invention will be described in detail with reference to the accompanying drawings, taking an example of a case where the front grille mounting construction is applied to a four-wheeled automobile. FIG. 1 is a perspective view showing a front part of automobile to which a front grille mounting construction according to an embodiment of the present invention is applied and a front grille, FIG. 2 is a partial sectional end plan view showing a principal part of a mounting construction, and FIG. 3 is a perspective view showing a principal part of a mounting construction.

In the front grille mounting construction according to this embodiment, a bracket 4 is fixed to a front fender 2 and a lamp support 3 (refer to FIG. 3) provided on an automobile body 1, a mounting hole 5b is formed in a center member 5 provided at the front center of the body 1 like the conventional mounting construction, and an locking claw 6a and ribs 6b, 6b (refer to FIG. 5) are formed on the front grille 6 side at the position corresponding to the bracket 4 and the position corresponding to the center member 5, respectively. The bracket 4 is provided with an engaging flange 4a engaging with the locking claw 6a and a mounting hole 4b engaging with a clip 10.

In this front grille mounting construction, the clip 10 is inserted and held in the mounting hole 4b, the locking claw 6a is engaged with the engaging flange 4a, and a clip 11 is pushed into the mounting hole 5b, so that the ribs 6b, 6b abut on a seating face 5c (refer to FIG. 7) of the center member 5, by which the front grille 6 is mounted to the body 1 without looseness.

Figure 2:
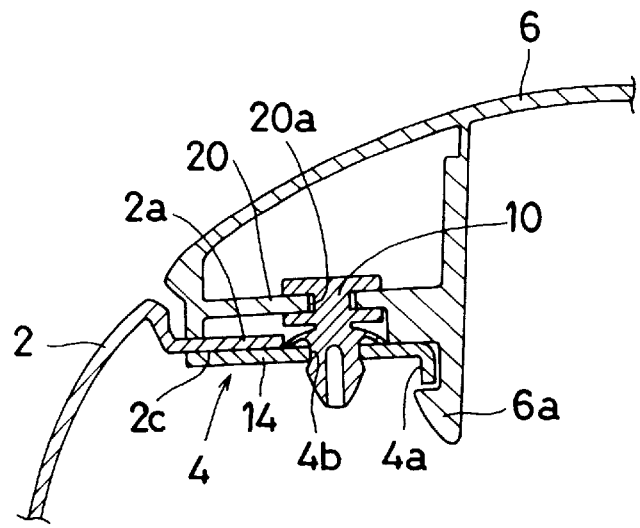
FIG. 2 is a partial sectional end plan view showing a principal part of a front grille mounting construction according to an embodiment of the present invention.
Figure 3:
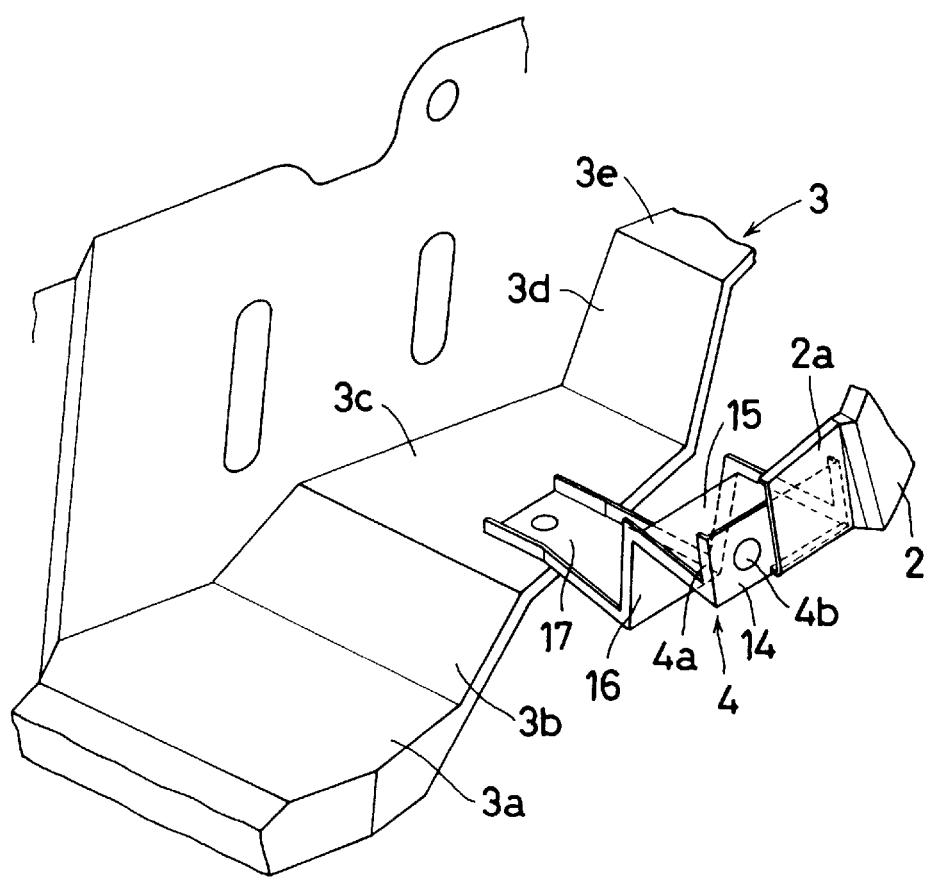
FIG. 3 is a partial perspective view showing a principal part of a front grille mounting construction according to an embodiment of the present invention.

The automobile body 1 has a support plate portion 2a formed by bending inward at the front end of the front fender 2 as shown in FIG. 2 and the lamp support 3 (refer to FIG. 3) at the rear of the support plate portion 2a. Also, the center member 5 (refer to FIG. 1) is fixed at the front center of the body 1. The back face of the support plate portion 2a forms a substantially flat fixing seating face 2c. The mounting hole 5b is formed at a predetermined place in a front end plate 5a of the center member 5.

As shown in FIG. 3, the lamp support 3 consists of substantially horizontal flat plate portions 3a, 3c, 3e and inclined plate portions 3b, 3d inclined rising at the end, and supports a tail plate portion 17 of the bracket 4 at the intermediate flat plate portion 3c as described later.

As shown in FIGS. 2 and 3, the bracket 4 comprises a substantially vertical fixing plate portion 14 fixed to the fixing seating face 2c of the support plate portion 2a, a flat plate portion 15 formed by bending rearward from the lower end of the fixing plate portion 14, a substantially vertical intermediate plate portion 16, and the tail plate portion 17 which is formed by bending rearward from the lower end of the intermediate plate portion 16 and fixed onto the flat plate portion 3c of the lamp support 3, these portions of the bracket 4 being connected integrally in this order. The right and left edges are bent to form a flange, and the flange portion of the fixing plate portion 14 forms the engaging flange 4a.

The bracket 4 has the mounting hole 4b formed at the area of the fixing plate portion 14 on which the support plate portion 2a does not abut. The fitting-type clip 10, which is an engaging member, engages with this mounting hole 4b, and the engaging flange 4a engages with the locking claw 6a.

Figure 6:
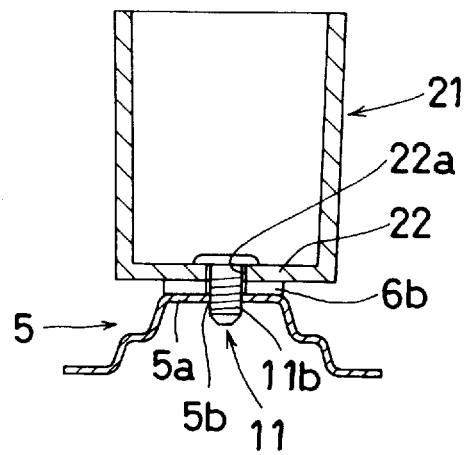
FIG. 6 is a partial sectional plan view showing a central principal part of a front grille mounting construction according to an embodiment of the present invention at the position of a through hole shown in FIG. 5.
Figure 7:
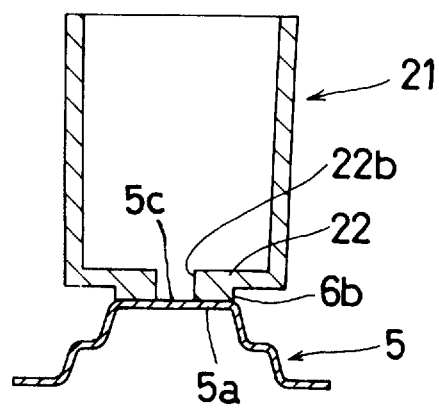
FIG. 7 is a partial sectional plan view showing a central principal part of a front grille mounting construction according to an embodiment of the present invention at the position of a rib shown in FIG. 5.
Figure 8:
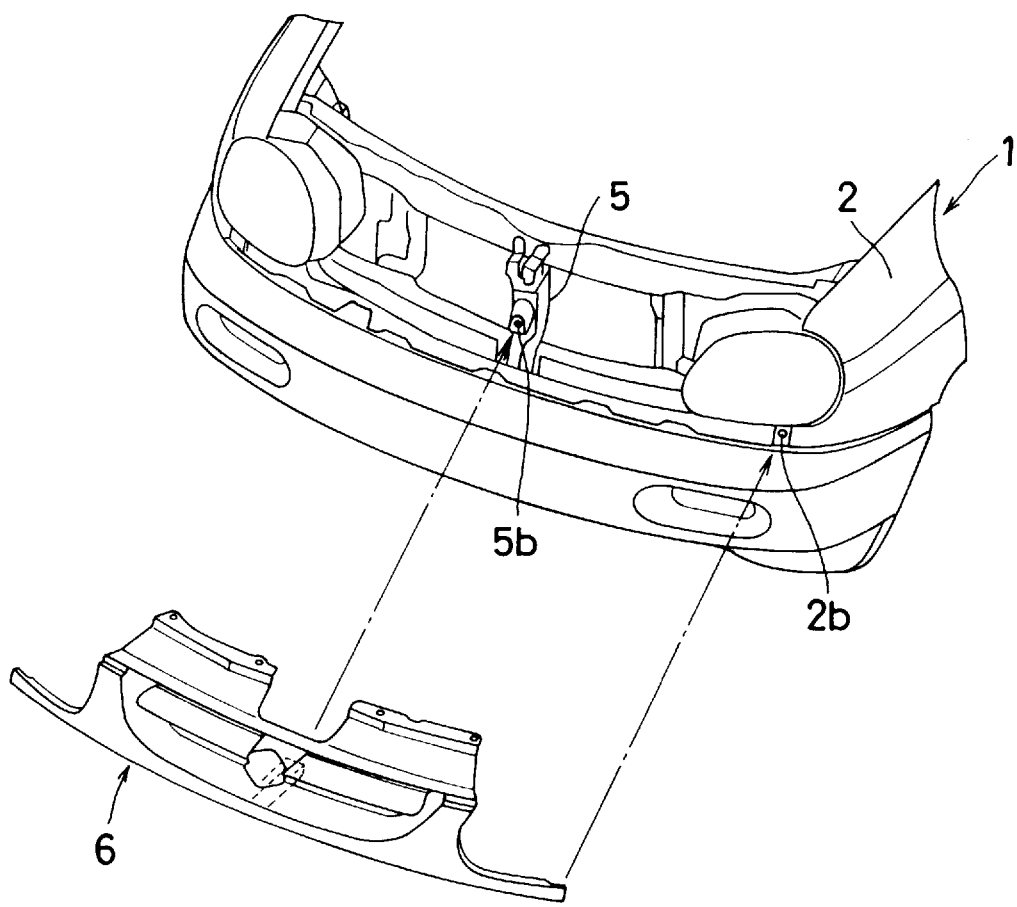
FIG. 8 is a perspective view for illustrating a conventional front grille mounting construction.

As shown in FIG. 1, the center member 5 is fixed vertically at the front center of the body 1. As shown in FIGS. 6 and 7, the mounting hole 5b is formed at a predetermined place in the front end plate 5a at a forward protruding position. The flat seating face 5c is formed under this mounting hole 5b.

Figure 4:
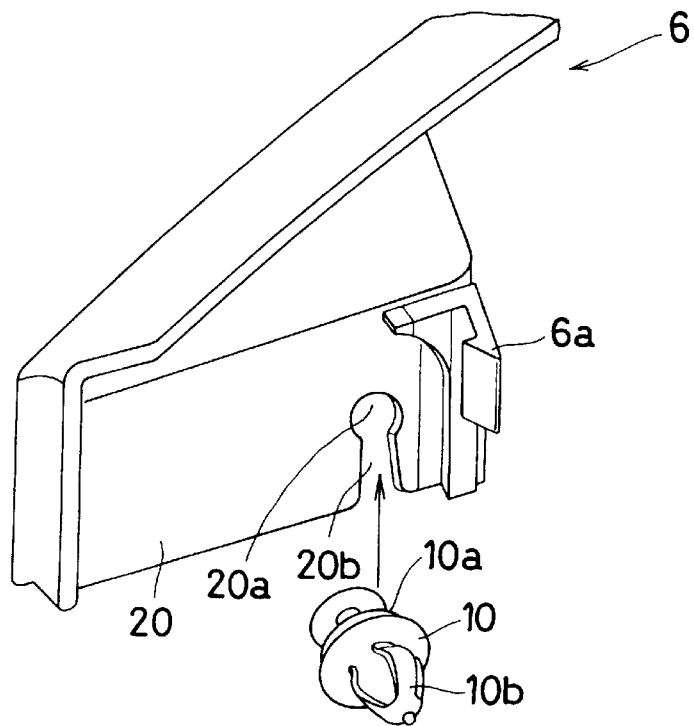
FIG. 4 is a partial perspective view of an end portion of a front grille according to an embodiment of the present invention, viewed from the rear side.

As shown in FIGS. 2 and 4, the front grille 6 has an engaging plate portion 20 arranged in parallel to the fixing plate portion 14 of the bracket 4 on the back side at the right and left end positions, the locking claw 6a integrally protruding rearward, a through hole 20a for holding the clip 10 to the engaging plate portion 20, and a notch 20b adjoining the lower part of the through hole 20a.

Figure 5:
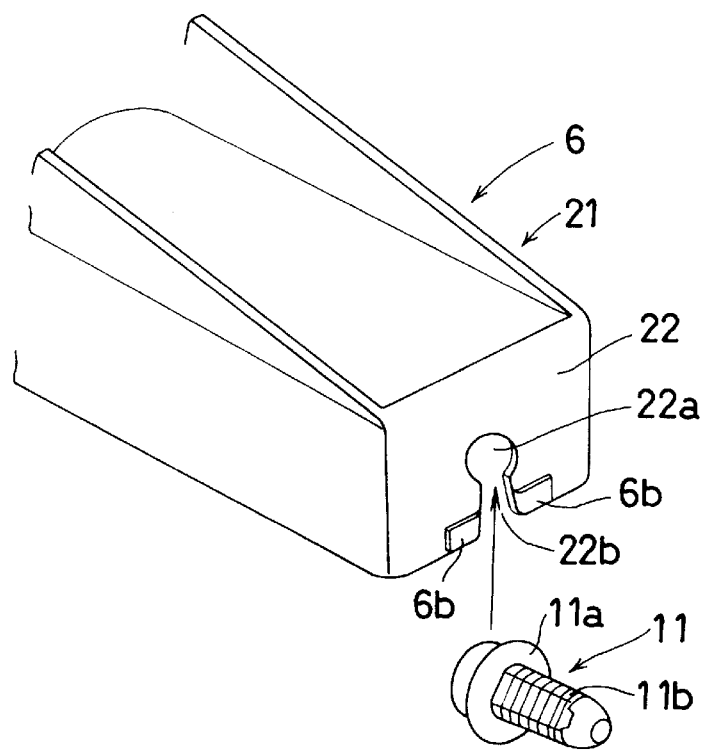
FIG. 5 is a partial perspective view of a central portion of a front grille according to an embodiment of the present invention, viewed from the rear side.

Also, the front grille 6 has a protruding portion 21 integrally protruding rearward at the center in the transverse direction and an engaging plate 22 at the rear end of this protruding portion 21 as shown in FIG. 5. The engaging plate 22 has a through hole 22a at the center thereof and a downward spreading notch 22b adjoining the lower part of the through hole 22a. On both sides at the lower end of the notch 22b are formed the rectangular flat plate shaped ribs 6b, 6b protruding toward the center member 5 on the body 1 side.

When the front grille 6 is mounted to the body 1, as shown in FIGS. 6 and 7, the tip end of the clip 11 inserted and held in the through hole 22a is inserted in the mounting hole 5b, and the ribs 6b, 6b are caused to abut on the seating face 5c of the center member 5.

Next, there will be described a procedure for mounting the front grille 6 to the body 1 in the front grille mounting construction according to the above embodiment of the present invention. The fitting-type clip 10 having a head 10a consisting of two spaced flange portions and an elastic bulge portion 10b as shown in FIG. 4 and the ridge-type clip 11 having a head 11a formed integrally and many ridges 11b at the outer periphery are used. The front grille 6 is applied to a predetermined position on the body 1 with the clips 10 and 11 being inserted and held in the through holes 20a and 22a, respectively, after passing through the corresponding notches 20b and 22b. Then, the elastic bulge portion 10b of the fitting-type clip 10 is inserted into the mounting hole 4b of the bracket 4, and the ridge 11b portion of the ridge-type clip 11 is pushed into the mounting hole 5b of the center member 5.

In this case, the ridge-type clip 11 is pushed as far as the rib 6b abuts on the seating face 5c of the center member 5. Thereupon, the front grille 6 is mounted firmly by the clips 10 and 11 because the locking claw 6a is locked by the engaging flange 4a of the bracket 4 to prevent coming out and the ribs 6b, 6b are pushed against the seating face 5c to eliminate looseness of installation.

According to the front grille mounting construction in accordance with the above embodiment of the present invention, the bracket 4 is fixed at a plurality of places on the body 1 side, that is, at the front fender 2 and the lamp support 3. Therefore, this construction has an advantage that the rigidity of the front parts of the vehicle body 1 such as the fender 2 and front grille 6 can be enhanced.

The present invention is not limited to the above embodiment. Various modifications can be made without departing from the spirit and scope of the invention. For example, this invention can be applied widely to an object having a front grille other than an automobile.

We claim:

1. A front grille mounting construction for mounting a front grille to a body by using engaging members inserted and held in through holes on the front grille side, comprising: a center member fixed on said body and including a mounting hole therethrough, a first bracket fixed to said body on one side of the center member and a second bracket fixed to said body on the other side of the center member, the front grille including said through holes at positions corresponding to the brackets and the center member for receiving and holding said engaging members, and locking claws formed on said front grille at positions corresponding to said first and second brackets, each said bracket being provided with a mounting hole engaging with one of said engaging members and an engaging flange engaging with one of said locking claws, and said engaging members being fitted to said mounting holes and said locking claws being locked by said engaging flanges to mount said front grille to said body at three places corresponding to said brackets and said center member.

2. A front grille mounting construction according to claim 1, wherein said front grille includes a protruding portion formed at a position corresponding to the center member, the protruding portion projecting rearward from the front grille to engage the center member.

3. A front grille mounting construction for mounting a front grille to a body by using engaging members inserted and held in through holes on the front grille side, comprising: a center member fixed to the body and projecting forwardly therefrom toward the front grille, the center member having a front end plate at a forward end thereof with a mounting hole formed through the front end plate, right and left brackets fixed to the body on opposite sides of the center member and a mounting hole formed through each bracket, locking pawls formed on the front grille at positions corresponding to the brackets, an engaging flange formed on each bracket for engaging one of the locking pawls, said through holes formed in the front grille at positions corresponding to the brackets for inserting and holding first said engaging members, and a rearward protruding portion formed on the front grille at a position corresponding to the center member and having an engaging plate on a rear end of the protruding portion with a through hole therein for inserting and holding a second said engaging member the front grille being mounted to the body by fitting the first engaging member into the mounting hole of each bracket while the locking pawl is locked by the engaging flange, and fitting the second engaging member into the mounting hole in the front end plate of the center member.

4. A front grille mounting construction according to claim 3, wherein a rib protruding toward the body is provided near said through hole formed in the engaging plate of the rear end of the protruding portion of the front grille, a seating face is provided at a position corresponding to the rib on the body side, and the front grille is mounted to the body such that the rib abuts the seating face by pushing a tip end of the second engaging member into the mounting hole in the front end plate of the center member.

5. A front grille mounting construction according to claim 2 wherein the center member includes a front end plate which protrudes toward the protruding portion of the front grille, the mounting hole in the center member being formed in the front end plate.

6. A front grille mounting construction according to claim 5 wherein the protruding portion of the front grille includes an engaging plate which engages the front end plate of the center member, the engaging plate having a through hole formed therein for receiving the engaging member, and further comprising ribs formed on the engaging plate on opposite sides of the through hole, the ribs abutting the front end plate of the center member.

7. A front grille mounting construction according to claim 6 wherein the engaging plate of the protruding portion includes a notch extending from an edge of the engaging plate into the through hole therein, and the ribs are formed on the engaging plate adjacent said edge on opposite sides of the notch.

8. A front grille mounting construction according to claim 4, wherein the rib is provided on both sides of the through hole in the engaging plate on the rear end of the protruding portion.

\* \* \* \* \*